US010205895B2

United States Patent
Lin et al.

(10) Patent No.: US 10,205,895 B2
(45) Date of Patent: Feb. 12, 2019

(54) CAPACITIVE IMAGE SENSOR WITH NOISE REDUCTION FEATURE AND METHOD OPERATING THE SAME

(71) Applicant: SunASIC Technologies Limited, Wanchai (HK)

(72) Inventors: Chi Chou Lin, New Taipei (TW); Zheng Ping He, Taipei (TW)

(73) Assignee: SUNASIC TECHNOLOGIES LIMITED, Wanchai (HK)

( * ) Notice: Subject to any disclaimer, the term of this patent is extended or adjusted under 35 U.S.C. 154(b) by 99 days.

(21) Appl. No.: 15/641,363

(22) Filed: Jul. 5, 2017

(65) Prior Publication Data

US 2019/0014274 A1    Jan. 10, 2019

(51) Int. Cl.
| H04N 5/30 | (2006.01) |
| H04N 5/357 | (2011.01) |
| G06K 9/00 | (2006.01) |
| H04N 5/378 | (2011.01) |
| H04N 5/374 | (2011.01) |

(52) U.S. Cl.
CPC .......... *H04N 5/357* (2013.01); *G06K 9/0002* (2013.01); *H04N 5/374* (2013.01); *H04N 5/378* (2013.01)

(58) Field of Classification Search
CPC ..... G06F 3/044; G06F 3/0416; G06K 9/0002; G06K 9/00087; H04N 5/374; H04N 5/378; H04N 5/357
See application file for complete search history.

(56) References Cited

U.S. PATENT DOCUMENTS

| 5,374,787 | A  | * | 12/1994 | Miller | .................. | G06F 1/1626 |
| | | | | | | 178/18.06 |
| 5,495,077 | A  | * | 2/1996 | Miller | .................. | G06F 1/1626 |
| | | | | | | 178/18.06 |
| 5,543,588 | A  | * | 8/1996 | Bisset | .................. | G06F 1/1626 |
| | | | | | | 178/18.06 |
| 6,239,389 | B1 | * | 5/2001 | Allen | .................... | G06F 1/1626 |
| | | | | | | 178/18.01 |
| 6,438,257 | B1 | * | 8/2002 | Morimura | .......... | G01R 27/2605 |
| | | | | | | 382/108 |
| 6,681,033 | B1 | * | 1/2004 | Yano | ........................ | G01D 5/24 |
| | | | | | | 382/108 |
| 8,058,937 | B2 | * | 11/2011 | Qin | ..................... | G06F 3/03547 |
| | | | | | | 178/18.06 |

(Continued)

*Primary Examiner* — Manav Seth
(74) *Attorney, Agent, or Firm* — Jackson IPG PLLC; Demian K. Jackson

(57) ABSTRACT

A capacitive image sensor with noise reduction feature and a method operating the capacitive image sensor are provided. The capacitive image sensor includes: a number of capacitive sensing units, arranged in a form of an array, wherein each of the number of capacitive sensing units switches between three states: sensing state, idle state, and emitting state; a driving source, for providing a driving signal to an adjacent finger overlying the number of capacitive sensing units through the number of capacitive sensing units which are in the emitting state; a number of driving switches, each connected between one of the number of capacitive sensing units and the driving source; and a control and timing logic, connected to each of the number of driving switches, for controlling the state of each of the number of capacitive sensing units.

13 Claims, 11 Drawing Sheets

(56) References Cited

U.S. PATENT DOCUMENTS

| | | | | |
|---|---|---|---|---|
| 8,174,273 B2* | 5/2012 | Geaghan | ................ | G06F 3/044 |
| | | | | 324/678 |
| 8,350,826 B2* | 1/2013 | Watanabe | ............. | G06F 3/0418 |
| | | | | 324/658 |
| 8,659,573 B2* | 2/2014 | Haga | ..................... | G06F 3/0412 |
| | | | | 178/18.01 |
| 8,803,838 B2* | 8/2014 | Haga | ..................... | G06F 3/0412 |
| | | | | 178/18.01 |
| 10,049,253 B2* | 8/2018 | Yang | ..................... | G06K 9/0002 |
| 2012/0050193 A1* | 3/2012 | Noguchi | ............. | G02F 1/13338 |
| | | | | 345/173 |
| 2015/0091859 A1* | 4/2015 | Rosenberg | ............. | G06F 3/044 |
| | | | | 345/174 |
| 2015/0346253 A1* | 12/2015 | Wang | ................ | G06K 9/00073 |
| | | | | 324/662 |
| 2018/0211083 A1* | 7/2018 | Du | ....................... | G06K 9/0002 |
| 2018/0224972 A1* | 8/2018 | Yang | ....................... | G06F 3/044 |

\* cited by examiner

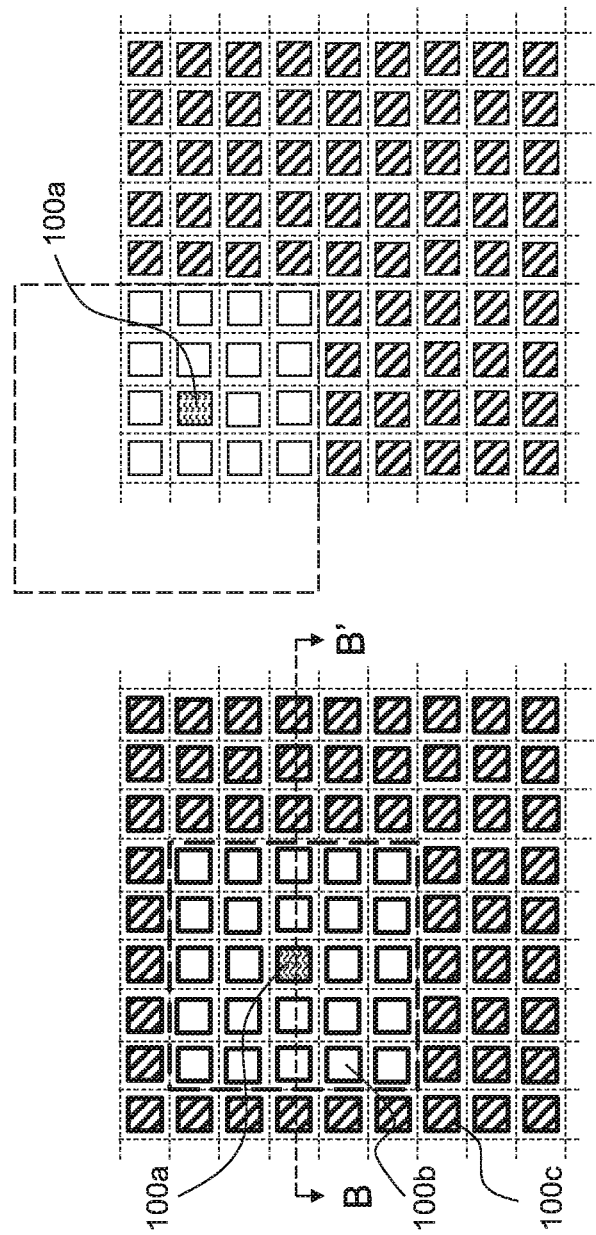

CAPACITIVE IMAGE SENSOR WITH NOISE REDUCTION FEATURE AND METHOD OPERATING THE SAME

FIELD OF THE INVENTION

The present invention relates to a capacitive image sensor and a method to operate the capacitive image sensor. More particularly, the present invention relates to a capacitive image sensor with noise reduction feature and a method to operate the capacitive image sensor.

BACKGROUND OF THE INVENTION

There are many human physiological characteristics which can be used to provide personnel identification for security purposes, such as fingerprint, retina, iris, DNA, or even facial features. For all the devices that are capable of distinguishing some physiological characteristics of one person from others', a fingerprint reader has the lowest cost and complexity, while the identification results are generally pretty good. In addition, the size of data required to store the minutiae of one fingerprint is small (ranging from 120 bytes to 2K bytes). This makes fingerprint identification devices widely accepted in many applications.

There are also many types of sensing techniques for capturing fingerprints. The popular ones are the optical type and capacitive type. Optical fingerprint sensing modules utilize reflected light intensity from the surface of a finger to tell where the ridges and valleys are on the contact portion of the finger. The advantage of the optical technique is reliability and low cost. However, due to the size of the embedded optical lens, the form factor of an optical fingerprint sensing module cannot be kept small. It is difficult for the optical type sensor to be embedded in portable devices. The capacitive-type fingerprint identification modules, on the other hand, are made out of silicon chips and can be made very compact. In some cases, when a fingerprint image can be fetched by slide scanning, the fingerprint sensor can be even thin and slim, too. The small form factor of capacitive-type fingerprint identification module makes it suitable for portable applications such as access control badges, bank cards, cellular phones, tablet computers, USB dongles, etc.

Capacitive-type fingerprint sensors are based on the principle that the capacitance of two parallel conductive plates is inversely proportional to the distance between them. A capacitive fingerprint sensor consists of an array of sensing units. Each sensing unit contains a sensing electrode. By using the sensing electrode as one plate of the two-plated capacitor and a dermal tissue as another plate, ridges and valleys of a fingerprint can be located by measuring the different capacitances. There are many prior arts related to the capacitive-type fingerprint identification module. Most of them have been applied to manufacture fingerprint sensors. However, there are also many problems pending for solutions. One of them is the accuracy of the sensing elements.

Due to the high-density nature, the popular capacitive fingerprint sensors are mainly manufactured with semiconductor processes. U.S. Pat. No. 7,864,992 discloses a capacitive fingerprint sensing device in which a driving signal is injected into the finger by feeding a conductive drive structure surrounding the sensor array and measuring the resulting change of the charge carried by the sensing structures in the sensor array. Although the fingerprint sensing system according to U.S. Pat. No. 7,864,992 provides for an excellent combination of fingerprint image quality and sensor protection, it would, in some applications be desirable to be able to acquire a high-quality fingerprint image without the use of a separate conductive drive structure. Therefore, an innovative structure of a sensing unit, a capacitive fingerprint sensor made by the sensing units and a method for running the sensing unit are desirable.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requirements above, a capacitive image sensor is provided. The capacitive image sensor includes: a number of capacitive sensing units, arranged in a form of an array, wherein each of the number of capacitive sensing units switches between three states: sensing state, idle state, and emitting state; and each of the capacitive sensing units comprises: a sensing electrode; and a voltage follower, having an input node connected to the sensing electrode; a driving source, for providing a driving signal to an adjacent finger overlying the plurality of capacitive sensing units through the plurality of capacitive sensing units which are in the emitting state; a number of driving switches, each connected between one of the plurality of capacitive sensing units and the driving source; and a control and timing logic, connected to each of the number of driving switches, for controlling the state of each of the number of capacitive sensing units. An electric potential of the sensing electrode is set to a predetermined voltage and changes in response to the driving signal provided to the adjacent finger while the capacitive sensing unit is in the sensing state; the electric potential of the sensing electrode is driven by the driving source while the capacitive sensing unit is in the emitting state; and the electric potential of the sensing electrode is set to a constant voltage or left floating while the capacitive sensing unit is in the idle state; the driving signal has a positive waveform or a negative waveform formed by a potential change or potential changes of the driving source; the electric potential of each of the number of capacitive sensing units is reset before the driving signal is provided to the adjacent finger through the number of capacitive sensing units which are in the emitting state.

Preferably, the capacitive image sensor further comprises at least one sample-and-hold circuit, for capturing and retaining a first output electric potential of the voltage follower of the capacitive sensing unit which is in the sensing state while the driving signal has the positive waveform and a second output electric potential of the voltage follower of the capacitive sensing unit which is in the sensing state while the driving signal has the negative waveform.

Preferably, the capacitive image sensor further comprises at least one signal conditioning circuit, each comprising at least one differential amplifier for amplifying the difference between the first electric potential and the second electric potential retained by the sample-and-hold circuit, wherein a difference between the first output electric potential and the second output electric potential is a noise-reduced value which represents a distance between the capacitive sensing unit in the sensing state and the adjacent finger.

Preferably, the at least one signal conditioning circuit further comprises an analog-to-digital converter for converting the amplified difference into a digitized noise-reduced value.

Preferably, the digitized noise-reduced value of each of the capacitive sensing units is collected and mapped to a corresponding location of the number of capacitive sensing units, and all collected digitized noise-reduced values together forms a noise-reduced fingerprint image of the adjacent finger, wherein each digitized noise-reduced value represents a pixel of the noise-reduced fingerprint image.

Preferably, each of the number of capacitive sensing units further comprises: a first comparative capacitor, having one node electrically connected to the voltage follower and another node electrically connected to ground; a bias voltage source, for providing a constant bias voltage to the sensing electrode and the first comparative capacitor; and a first switch, connected between the bias voltage source and the first comparative capacitor.

Preferably, the first comparative capacitor comprises a reference capacitor and a parasitic capacitance.

Preferably, the reference capacitor is a MOSFET (Metal-Oxide-Semiconductor Field-Effect Transistor) capacitor, a PIP (Polysilicon-Insulator-Polysilicon) capacitor or a MIM (Metal-Insulator-Metal) capacitor.

Preferably, each of the capacitive sensing units further comprises: a share switch, connected between the sensing electrode and the voltage follower; a second comparative capacitor, connected between the sensing electrode and the ground; and a second switch, connected between the sensing electrode and the ground. The sensing electrode is reset to ground potential when the second switch is turned on.

Preferably, each sample-and-hold circuit further comprises: two charge holding capacitors, one for holding the first output electric potential and the other for holding the second output electric potential; and at least one selecting switch, connected between the voltage follower and the two charge holding capacitors, for switching between one and the other depending on whether the driving signal has the positive waveform or the negative waveform.

Preferably, one of the capacitive sensing units is in the sensing state while another portion of the capacitive sensing units are in the emitting state, and the rest of the number of capacitive sensing units are in the idle state.

A method for obtaining a fingerprint image by the capacitive image sensor is also disclosed. The method comprises the steps of: resetting the electric potential of each of the number of capacitive sensing units; exerting the driving signal having a first waveform to the number of capacitive sensing units which are in the emitting state; capturing a first output electric potential of the voltage follower of each of the number of capacitive sensing units which are in the sensing state; retaining the first output electric potential of the voltage follower of each of the number of capacitive sensing units which are in the sensing state; resetting the electric potential of each of the number of capacitive sensing units; exerting the driving signal having a second waveform to the number of capacitive sensing units which are in the emitting state; capturing a second output electric potential of the voltage follower of each of the number of capacitive sensing units which are in the sensing state; retaining the second output electric potential of the voltage follower of each of the number of capacitive sensing units which are in the sensing state; calculating the difference between the first output electric potential and second output electric potential; converting the difference into a noise-reduced value; sequentially collecting and digitizing the noise-reduced values of the number of capacitive sensing units which are in the sensing state into digitized noise-reduced values; and mapping the digitized noise-reduced values to corresponding locations of the number of capacitive sensing units to form a noise-reduced fingerprint image. Each digitized noise-reduced value represents a pixel of the noise-reduced image. If the first waveform is a positive waveform, then the second waveform is a negative waveform; if the first waveform is a negative waveform, then the second waveform is a positive waveform.

BRIEF DESCRIPTION OF THE DRAWINGS

FIG. 4(a) is a schematic snapshot of the capacitive image sensor in the course of operation.

FIG. 4(b) is a schematic snapshot of the capacitive image sensor when the sensing state unit is close to the edge of the array of sensing units.

DETAILED DESCRIPTION OF THE PREFERRED EMBODIMENTS

The present invention will now be described more specifically with reference to the following embodiments.

Figure 1:
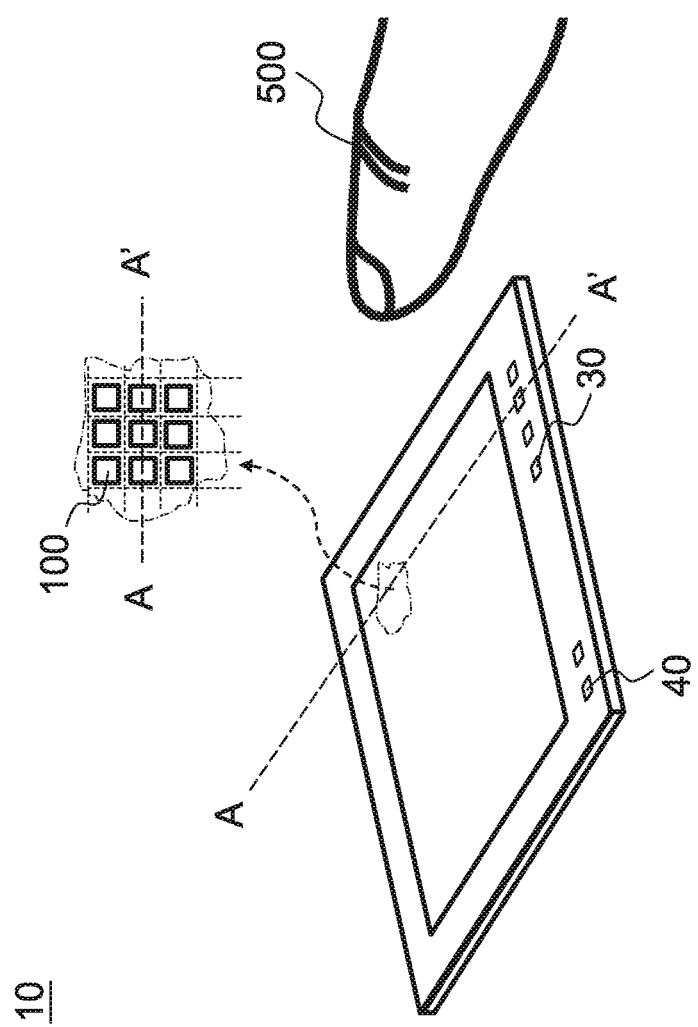
FIG. 1 is a schematic diagram of a capacitive image sensor according to the present invention.

Please see FIG. 1. FIG. 1 shows a schematic diagram of a capacitive image sensor 10 (chip) according to the present invention. The capacitive image sensor 10 is used to depict ridges and valleys of a surface of a finger 500, further converting the results into a noise-reduced fingerprint image of the finger. The capacitive image sensor 10 includes an array of capacitive sensing units 100, contact pads 40 of a power supply, and contact pads 30 of an input/output (I/O) interface. The output from each capacitive sensing unit 100 represents one corresponding pixel of the fingerprint image.

Figure 2:
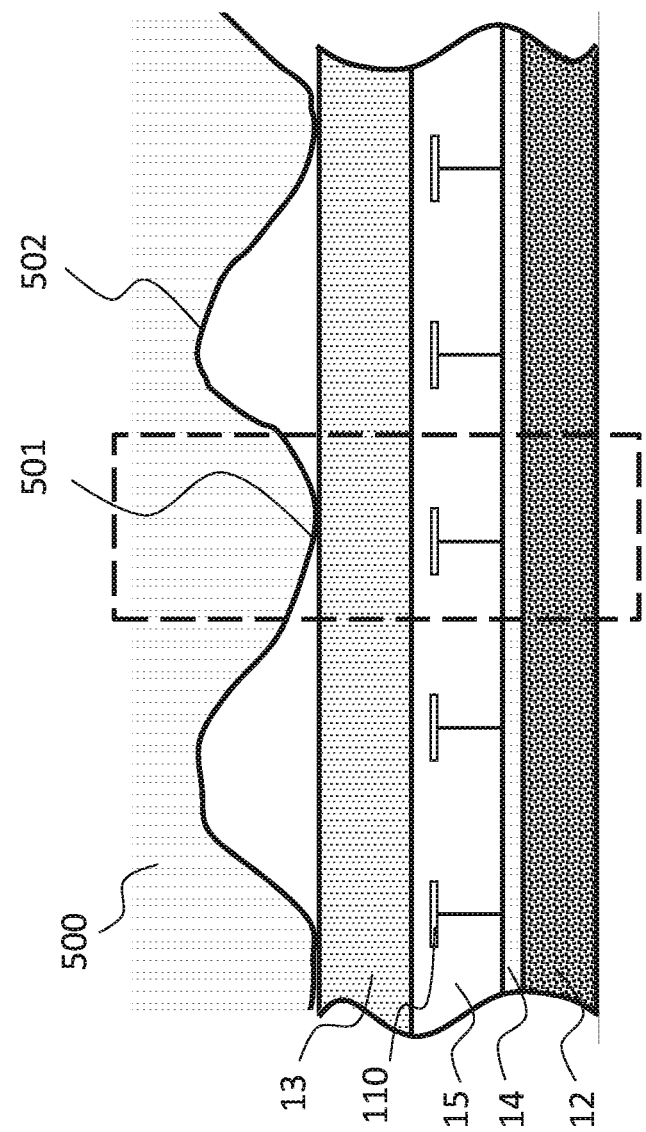
FIG. 2 is a schematic cross-section of a portion of the capacitive image sensor taken along line A-A' in FIG. 1.

FIG. 2 is a schematic cross-section of a portion of the capacitive image sensor 10 taken along line A-A' in FIG. 1, with a protective layer 13 located on top capacitive image sensor 10 and a finger 500 placed on the protective layer 13.

The protective layer 13 may be made of glass, sapphire, epoxy compound, or coating material. The capacitive image sensor 10 includes a semiconductor substrate 12, having the array of capacitive sensing units 100 formed thereon. The surface of the fingertip 500 includes ridges 501 that are in contact with the protective layer 13 and valleys 502 that are spaced apart from the protective layer 13. Each capacitive sensing unit 100 can be used to transform a distance between a portion of a surface of the approaching finger 500 and a top surface of itself into an output electric potential. Five capacitive sensing units 100 are shown in FIG. 2, and one of the capacitive sensing units 100 is enclosed by a dashed frame. Each capacitive sensing unit 100 includes a sensing electrode 110 which is formed below the protective layer 13 and is in the form of a conductive plate. Below the conductive plate are active semiconductor circuitries 14 schematically shown by a forward-diagonal-lines region in FIG. 2. At least one insulating layer 15 is formed to enclose the sensing electrodes 110. Details of the active semiconductor circuitry 14 will be described in later paragraphs.

Figure 3:
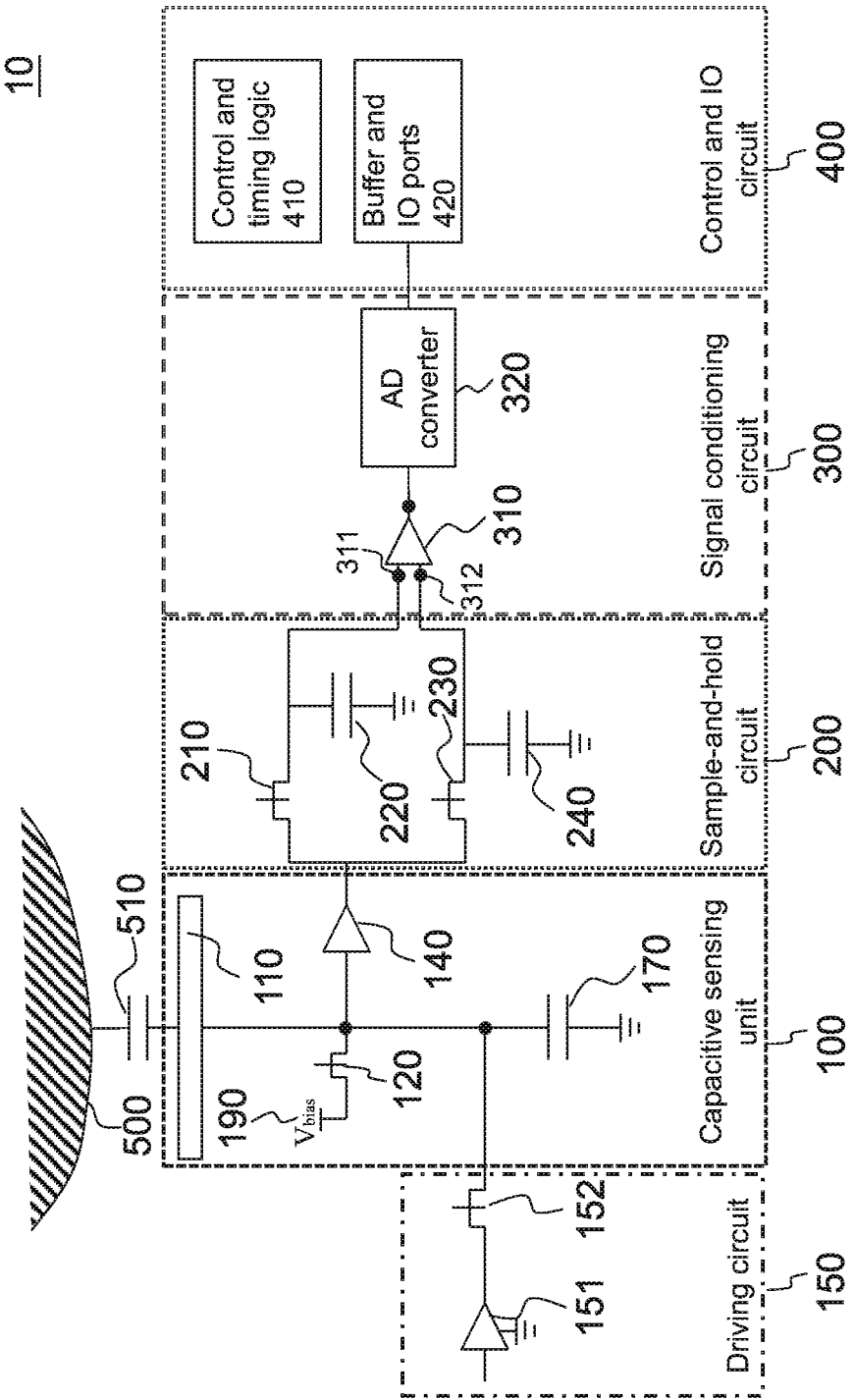
FIG. 3 is an equivalent circuit of the capacitive image sensor (one pixel) of a first embodiment according to the present invention.

Please refer to FIG. 3. FIG. 3 is an equivalent circuit of the capacitive image sensor 10 (one pixel) according to the present invention. The capacitive image sensor 10 includes an array of capacitive sensing units 100 (enclosed by dashed line), a driving circuit 150, a number of sample-and-hold circuits 200 (enclosed by dotted line), a number of signal conditioning circuits 300 (enclosed by double-dashed line), and a control and TO circuit 400 (enclosed by double-dotted line). For illustration purpose, FIG. 3 only shows one capacitive sensing unit 100, one sample-and-hold circuit 200 and one signal conditioning circuit 300. The sample-and-hold circuit 200, the signal conditioning circuit 300, the control and IO circuit 400, a portion of the capacitive sensing unit 100, and the driving circuit 150 are formed inside the active semiconductor circuitry 14. Each circuit will be described in details below.

The capacitive sensing unit 100 includes a sensing electrode 110, a first switch 120, a voltage follower 140, a first comparative capacitor 170, and a bias voltage source 190. A parasitic capacitance (not shown) representing the sum of parasitic capacitance between the sensing electrode 110 and other parts of the sensing structure that are not connected to the sensing electrode 110 (not shown) can be treated as a part of the first comparative capacitor 170. A reference capacitor (not shown), having a capacitance $C_r$, is formed between ground and the sensing electrode 110, and the reference capacitor is used to store the electric charges during the operation. The reference capacitor is a MOSFET (Metal-Oxide-Semiconductor Field-Effect Transistor) capacitor, a PIP (Polysilicon-Insulator-Polysilicon) capacitor or a MIM (Metal-Insulator-Metal) capacitor. The first comparative capacitor 170 is an equivalent capacitor, denoted as $C_c$, representing the total effect of the parasitic capacitance and the reference capacitor, i.e. $C_c=C_r+C_p$. Therefore, one node of the first comparative capacitor 170 is electrically connected to the voltage follower 140, and the other node is electrically connected to the ground node. In some manufacturing processes, when the value of the parasitic capacitance is well controlled, the reference capacitor may not be necessary, i.e. $C_c=C_p$. The driving circuit 150 includes a driving source 151 and a driving switch 152. The driving source 151 is a low-impedance voltage source controlled by a control and timing logic 410 to provide a positive or negative waveform (a voltage raise or drop signal) to the capacitive sensing unit 100 while the capacitive sensing unit 100 is in an emitting state. More precisely, the positive waveform and/or the negative waveform is formed by the potential, changing with time, at the output node of the driving source 151. The driving switch 152, connecting the output node of the driving source 151 to the sensing electrode 110, is also controlled by the control and timing logic 410 to allow or disallow the positive or negative waveform be sent to the capacitive sensing units 100. Different states of the capacitive sensing unit 100 will be described in later paragraphs. The first switch 120, the voltage follower 140, the first comparative capacitor 170, the driving source 151, and the driving switch 152 are formed inside the active semiconductor circuitry 14. When a finger 500 approaches the capacitive image sensor 10, a finger capacitance 510, denoted as $C_f$, is formed between the finger 500 and the sensing electrode 110. The sensing electrode 110 is a metal plate at the top side of the capacitive sensing unit 100, used to form one side of a parallel plate capacitor. Here, the parallel plate capacitor is an equivalent capacitor representing the finger capacitance 510. The other side of the parallel plate capacitor is the surface of the finger 500, which is part of the human body. The first switch 120 is a MOS device used as a switch to connect or disconnect the bias voltage source 190, denoted as $V_{bias}$, to the sensing electrode 110 and the first comparative capacitor 170. The bias voltage source 190 is used to provide a constant bias voltage. The bias voltage is a 1.5V constant voltage reference in the present embodiment. The voltage follower 140 is a circuit device that has input and output signals. The output signal tracks the input signal. Usually, a voltage follower is implemented as a unity gain amplifier. The input node of the voltage follower 140 is connected to the sensing electrode 110, and the output node is connected to the sample-and-hold circuit 200.

Figure 4C:
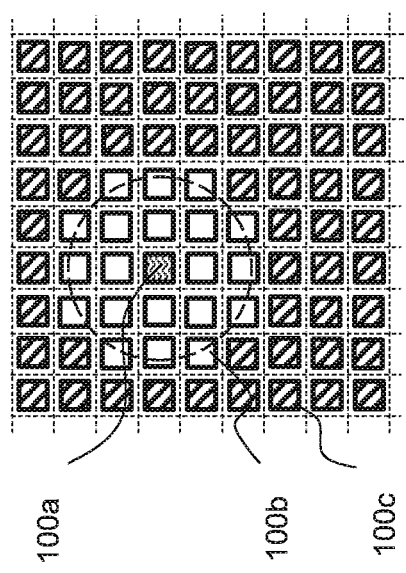
FIG. 4(c) shows another aspect to determine the idle state units.

Please refer to FIG. 4(a). FIG. 4(a) schematically shows a snapshot of the capacitive image sensor 10 in the course of operation. The capacitive sensing units 100 can be in one of the three states: sensing state, idle state, or emitting state. In one operation period of the capacitive image sensor 10, capacitive sensing units 100 will sequentially enter sensing state, and each capacitive sensing unit 100 will only enter sensing state once. A group of capacitive sensing units 100 surrounding the capacitive sensing unit 100 in the sensing state are set to the idle state. As shown in FIG. 4(a), one capacitive sensing unit 100a in the sensing state (hereinafter referred to as 'sensing state unit' 100a) is marked with wave pattern, a group of the capacitive sensing units 100b in the idle state (hereinafter referred to as 'idle state unit' 100b) are squares with no marks, and another group of capacitive sensing units 100c in the emitting state (hereinafter referred to as 'emitting state unit' 100c) are marked with downward diagonal pattern. In this embodiment, all capacitive sensing units 100 located within two lines of pixels from the sensing state unit 100a are set to the idle state. In other words, all capacitive sensing units in the dashed frame except the capacitive sensing unit 100a located in the center are in the idle state, and the capacitive sensing unit 100a located in the center is in the sensing state. All other capacitive sensing units outside the dashed frame are set to the emitting state. Here, the size of the dashed frame is not limited to a 5×5 square. It may be a square of 7×7 sensing units. FIG. 4(b) shows a case that when the sensing state unit 100a is close to the edge of the array, only 15 sensing units within two lines of pixels from the sensing state unit 100a (within the dashed frame) are set to idle state. FIG. 4(c) shows another aspect, i.e. a circle, to determine the 'distance'. The shape is not limited to a square or a circle, as long as it is symmetric respect to the sensing state unit 100a.

Figure 4D:
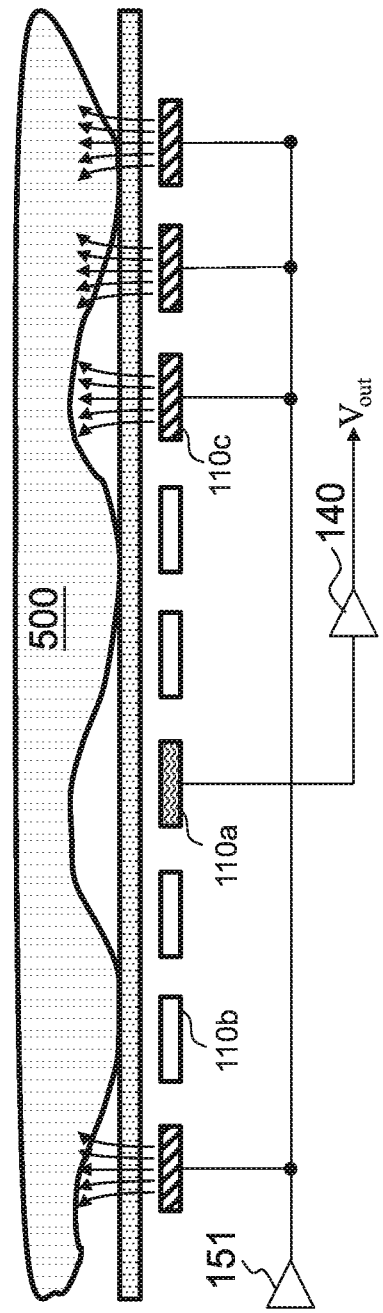
FIG. 4(d) is a cross-section view of a portion of the capacitive sensing units array taken along line B-B' in FIG. 4(a).
Figure 5:
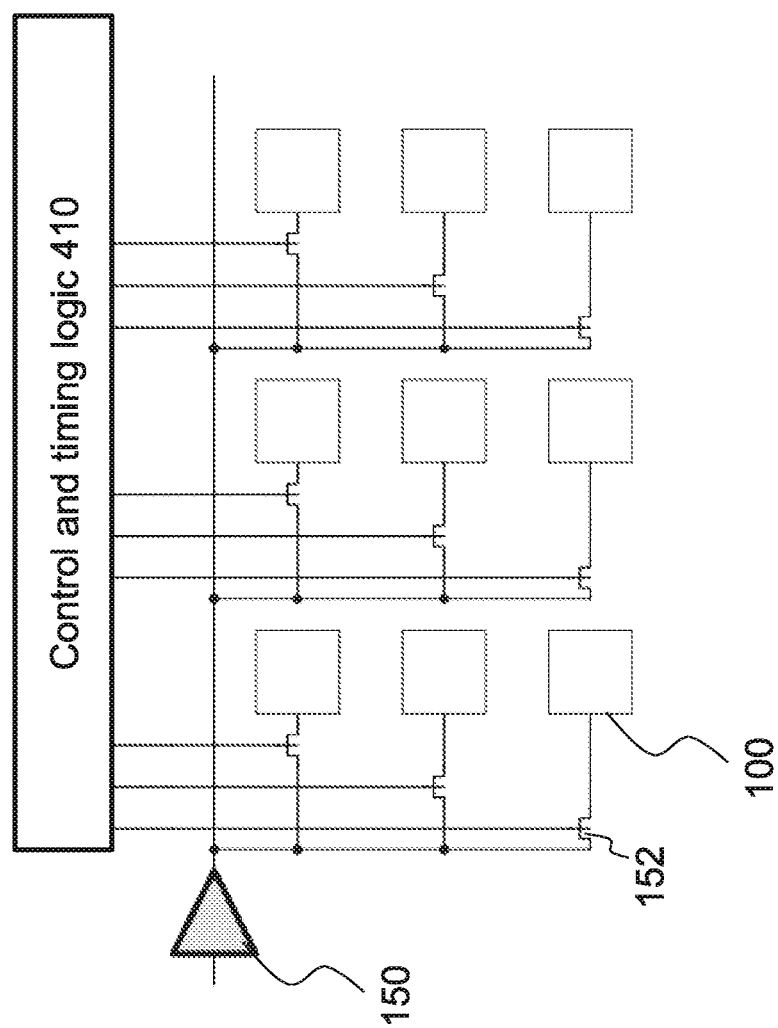
FIG. 5 is a schematic configuration of driving switches and a control and timing logic.

Please refer to FIG. 4(d). FIG. 4(d) is a cross-section view of a portion of the capacitive sensing units 100 array taken along line B-B' in FIG. 4(a). The sensing electrode 110c of the emitting state units 100c is connected to the driving source 151 to couple the sensing signal to a user's finger 500. The sensing electrode 110c is directly driven by the driving source 151 while the capacitive sensing unit 100 is in the emitting state. A driving impedance (not shown) represents the sum of the impedance formed between each sensing electrode 110c of the emitting state unit 100c and the user's finger 500. Because the total area of the sensing electrodes 110c is large, the value of the driving impedance is low enough to be neglected. To be more precise, the array size of the capacitive image sensor 10 is no less than 50×50 pixels, and most of the capacitive sensing units 100 are set to the emitting state. An output electric potential of the sensing state unit 100a, in response to the sensing signal coupled to the finger 500 and according to the electric potential at the sensing electrode 110a, is provided to the sample-and-hold circuit 200 via the voltage follower 140. The finger capacitance 510 is formed between the finger 500 and the sensing electrode 110a of the sensing state unit 110a. The sensing electrode 110b of the idle state units 100b is set to inactive to ensure the sensing state unit 100a receives the driving signal from the user's finger 500. The idle state units 100b can minimize the unwanted direct influence of the driving signal to the sensing state unit 100a. One example of 'inactive' is to set the electric potential at the sensing electrode 110b to a predetermined electric potential while the capacitive sensing unit 100 is in the idle state, e.g. a fixed electric potential close to the output electric potential. An alternative example of the 'inactive' is to leave the electric potential of the sensing electrode 110b of the idle state units 100b floating. FIG. 5 schematically shows a configuration of the driving switches 152 and the control and timing logic 410. The driving switches 152 are controlled by the control and timing logic 410 to connect or disconnect the sensing units 100 to the driving source 150. In other words, the control and timing logic 410 controls the state of each capacitive sensing unit 100, including its state.

The sample-and-hold circuit 200 in FIG. 3 is a device used to capture and retain output electric potentials from the capacitive sensing unit 100. The sample-and-hold circuit 200 includes a first sample switch 210, a first charge holding capacitor 220, a second sample switch 230, and a second charge holding capacitor 240. The first sample switch 210 is formed between the output node of the voltage follower 140 and the first charge holding capacitor 220, and is a MOS device used as a switch to connect the output of the voltage follower 140 to the first charge holding capacitor 220. The first charge holding capacitor 220 is a capacitor used to capture and retain a first output electric potential, denoted as $V_1$, from the voltage follower 140 through the first sample switch 210. One node of the first charge holding capacitor 220 is connected to the first sample switch 210 and the other node is connected to the ground. The second sample switch 230 is formed between the output node of the voltage follower 140 and the second charge holding capacitor 240, and is a MOS device used as a switch to connect the output of the voltage follower 140 to the second charge holding capacitor 240. The second charge holding capacitor 240 is a capacitor used to capture and retain a second output electric potential, denoted as $V_2$, from the voltage follower 140 through the second sample switch 230. One node of the second charge holding capacitor 240 is connected to the second sample switch 230 and the other node is connected to the ground. The first sample switch 210 and the second sample switch 230 work together as a selecting switch for choosing the output target (either the first or the second charge holding capacitor) for the voltage follower 140. In the present embodiment, the sample-and-hold circuit 200 retains at least a first and a second output electric potentials under a corresponding positive waveform or negative waveform.

The signal conditioning circuit 300 is a circuit to amplify a voltage difference between the first and second output electric potentials, possibly with level shift, and then convert the result to a digitized value. The signal conditioning circuit 300 includes a differential amplifier 310 and an analog-to-digital converter (AD converter) 320. A first input node 311 of the differential amplifier 310 is connected to the first charge holding capacitor 220 and the first sample switch 210, a second input node 312 of the differential amplifier 310 is connected to the second charge holding capacitor 240 and the second sample switch 230, and an output node of the differential amplifier 310 is connected to an input node of the analog-to-digital converter 320. The differential amplifier 310 is an amplifier used to produce a voltage output that is proportional to the difference between the first and second output electric potentials. The analog-to-digital converter 320 converts the output electric potential of the differential amplifier 310 and produces a binary value that represents the voltage level.

The Control and IO circuit 400 is a circuit that handles the timing sequence and data input/output of the capacitive image sensor 10. The Control and IO circuit 400 comprises a Control and Timing logic 410 and Buffer and IO ports 420. The Control and Timing logic 410 controls all switches in the capacitive image sensor 10. The Buffer and IO ports 420 receives the output data of the analog-to-digital converter 320 and store the data into a buffer and then send out the data at a proper time.

Figure 6:
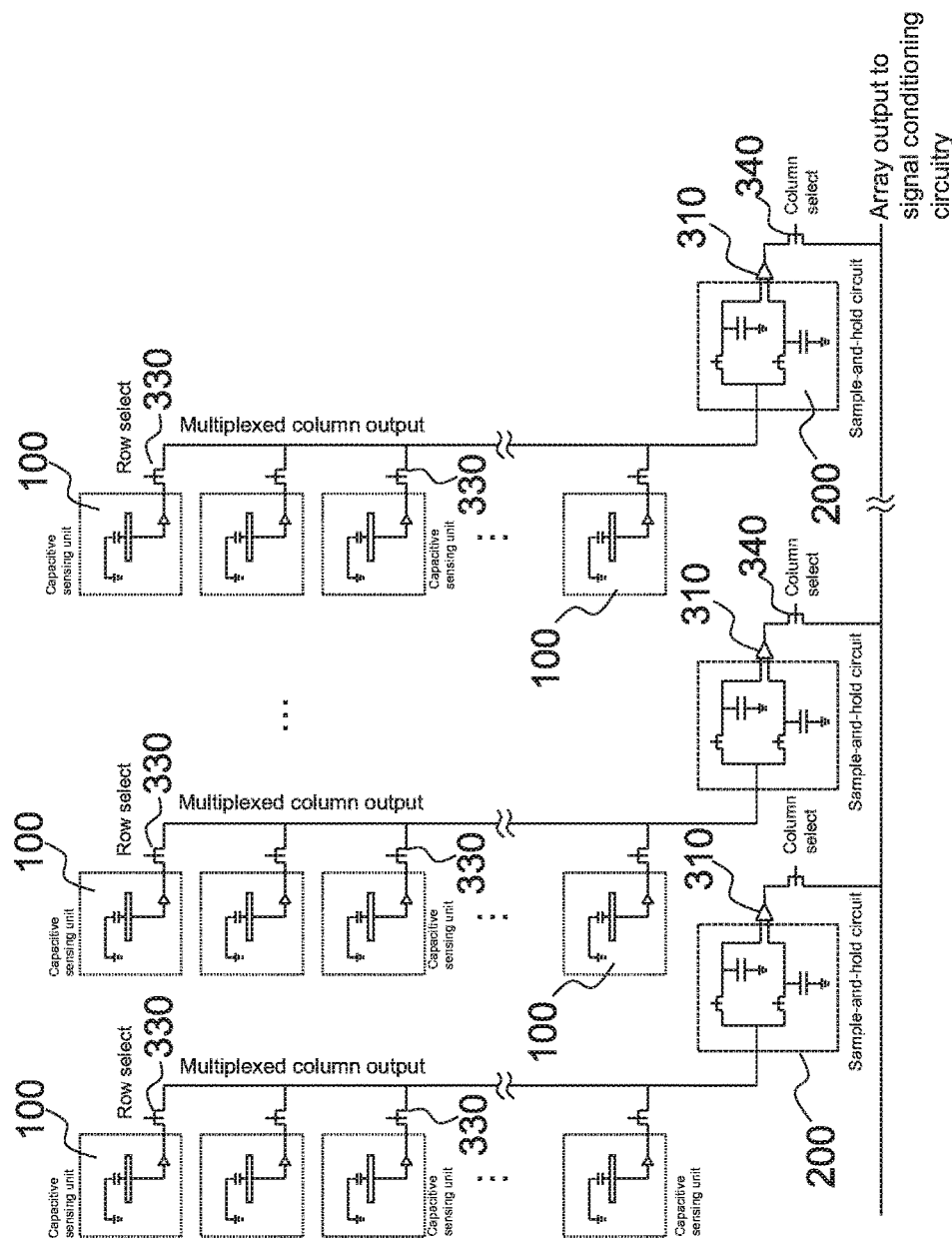
FIG. 6 is a schematic diagram of a typical implementation of the capacitive image sensor according to the present invention.

Please refer to FIG. 6. FIG. 6 is a schematic diagram of a typical implementation of the capacitive image sensor 10 according to the present invention. The capacitive image sensor 10 includes a two-dimensional array of capacitive sensing units 100 and a number of sample-and-hold circuits 200. Other circuits are not shown in this diagram. The two-dimensional array of the capacitive sensing units 100 is enabled in a row-by-row sequence. The capacitive sensing units 100 in the same column share the same output wire through separate row select signals. One row is enabled by the corresponding row select signal at a time. The row select switches 330 are controlled by the row select signals sent out by the control and timing logic 410. Each column output wire connects to a shared sample-and-hold circuit 200 and a differential amplifier 310. The output of the differential amplifiers 310 is multiplexed to a single output signal through a set of column select signals. The column select switches 340 are controlled by column select signals sent out by the control and timing logic 410. Only one of the column select signals is activated at a time, to allow the output of the differential amplifiers 310 to be sequentially delivered to the analog-to-digital converter 320 in the signal conditioning circuit 300.

Figure 7:
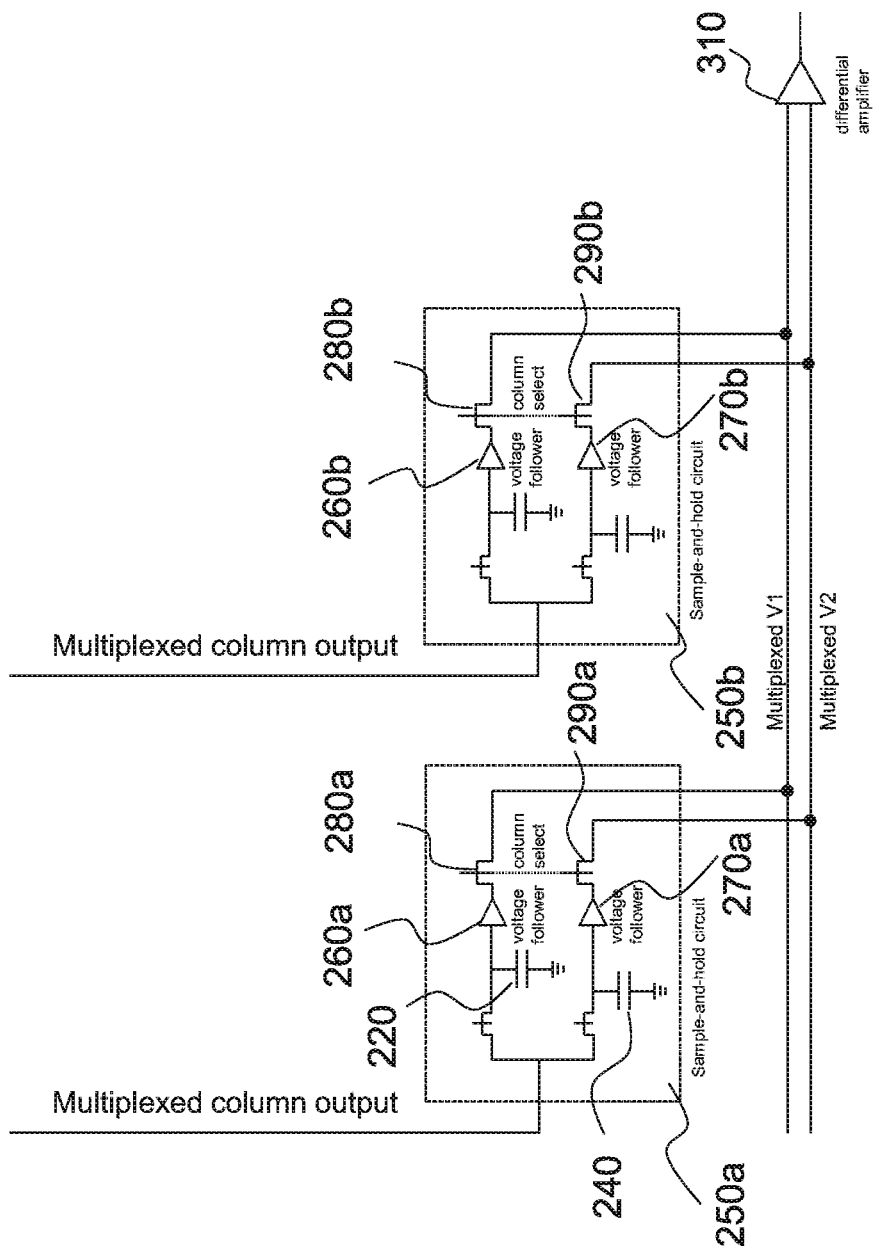
FIG. 7 shows an alternative structure of a sample-and-hold circuit and that of the connection between a differential amplifier and the sample-and-hold circuit.

Please refer to FIG. 7. FIG. 7 shows an alternative structure of a sample-and-hold circuit 250a/250b and that of the connection between the differential amplifier 310 and the sample-and-hold circuit 250. The sample-and-hold circuits 250a/250b may share the same differential amplifier 310 through additional voltage followers (e.g. 260a and 270a), and column select switches (e.g. 280a and 290a) between the charge holding capacitors (220 and 240) and the differential amplifier 310. For example, a voltage follower 260a and a column select switch 280a are formed between the first charge holding capacitor 220 and the differential amplifier 310, and a voltage follower 270a and a column select switch 290a are formed between the second charge holding capacitor 240 and the differential amplifier 310.

Figure 8:
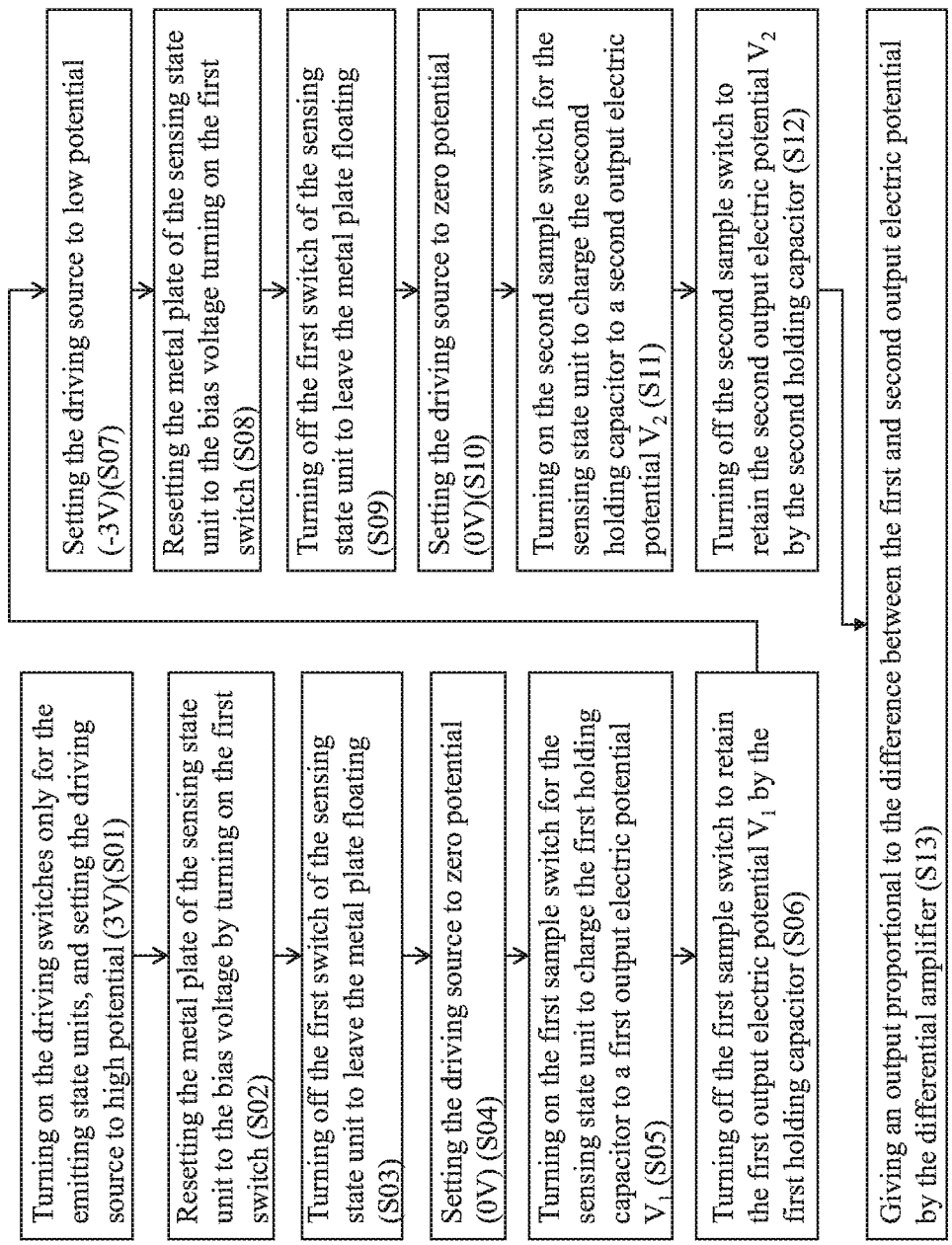
FIG. 8 is a flowchart illustrating a procedure to operate a capacitive sensing unit in the capacitive image sensor of the first embodiment.

A method for operating the capacitive image sensor 10 is also disclosed. Please refer to FIG. 8. It is a flowchart illustrating a procedure to operate a capacitive sensing unit 100 in the capacitive image sensor 10. The steps are:

(S01) turning on the driving switches 152 only for the emitting state units 110c, and setting the driving source 151 to high potential (3V);

(S02) resetting the metal plate (sensing electrode 110a) of the sensing state unit 100a to the bias voltage by turning on the first switch 120;

(S03) turning off the first switch 120 of the sensing state unit 100a to leave the metal plate floating;

(S04) setting the driving source 151 to zero potential (0V);

(S05) turning on the first sample switch 210 for the sensing state unit 100a to charge the first charge holding capacitor 220 to a first output electric potential $V_1$;

(S06) turning off the first sample switch 210 to retain the first output electric potential $V_1$ by the first charge holding capacitor 220;

(S07) setting the driving source 151 to low potential (−3V);

(S08) resetting the metal plate of the sensing state unit 100a to the bias voltage by turning on the first switch 120;

(S09) turning off the first switch 120 of the sensing state unit 100a to leave the metal plate floating;

(S10) setting the driving source 151 to zero potential (0V);

(S11) turning on the second sample switch 230 for the sensing state unit 100a to charge the second charge holding capacitor 240 to a second output electric potential $V_2$;

(S12) turning off the second sample switch 230 to retain the second output electric potential $V_2$ by the second charge holding capacitor 240; and (S13) giving an output electric potential proportional to the difference between the first and second output electric potential by the differential amplifier 310.

Here, step S01 to S03 are the first reset stage, step S04 to S06 are the first sensing stage, steps S07 to S09 are the second reset stage, steps S10 to S12 are the second sensing stage, and step S13 is the output stage. The output electric potential proportional to the difference between the first and second output electric potential in step S13 is a noise-reduced value of that pixel (the sensing state unit 100a). The noise-reduced value represents a distance between the sensing state unit 100a and the portion surface of the finger above the sensing state unit 100a. The sequence of steps S01-S06 and steps S07-S12 can be switched. Namely, a positive waveform and a negative waveform are applied by the driving source to get the noise-reduced value no matter what the sequence is. For a better understanding, take the waveform formed from step S01 to step S04 as a first waveform and the waveform formed from step S07 to step S10 as a second waveform. If the first waveform is a positive waveform, then the second waveform is a negative waveform; if the first waveform is a negative waveform, then the second waveform is a positive waveform. There may be additional steps to convert the output electric potentials into a digitized image, e.g. a grayscale image. The steps are:

(S14) sequentially collecting the noise-reduced values obtained under corresponding positive waveform and negative waveform for each pixel (i.e. capacitive sensing units 100 will enter sensing state sequentially);

(S15) converting the noise-reduced values into digitized noise-reduced values; and (S16) mapping the digitized noise-reduced values to corresponding locations of capacitive sensing units to form a noise-reduced fingerprint image.

For a better understanding, a result analysis is illustrated below. After Step S04, the potential of the metal plate should be $$V_{m1} = V_{bias} + \Delta V_{d1} \bullet \left(\frac{C_f}{C_f + C_r + C_p}\right) = 1.5 - 3 \bullet \left(\frac{C_r}{C_f + C_r + C_p}\right).$$

Here, $V_{bias}$ is the potential of the bias voltage source (1.5V), $\Delta V_{d1}$ is the potential change caused by a negative waveform (a voltage drop signal) sent by the driving source 151, $C_f$ is a value of the finger capacitance 510, and ($C_r + C_p$) is a value of the comparative capacitor 170 ($C_p$ is a value of the parasitic capacitance, $C_r$ is a value of the reference capacitor). The effect of the driving impedance is small enough to be neglected. After Step S05, the first output electric potential can be represented by $$V_1 = V_{m1} \bullet G_f + N = G_f \bullet \left\{V_{bias} + \Delta V_{d1} \bullet \left(\frac{C_f}{C_f + C_r + C_p}\right)\right\} + N.$$

Here, N is the fixed pattern noise caused by the voltage follower circuit and impedance mismatch of circuit elements, and $G_f$ is the gain factor of the voltage follower, usually less than 1. After Step S10, the potential of the metal plate should be $$V_{m2} = V_{bias} + \Delta V_{d2} \bullet \left(\frac{C_f}{C_f + C_r + C_p}\right) = 1.5 + 3 \bullet \left(\frac{C_r}{C_f + C_r + C_p}\right).$$

Here, $\Delta V_{d2}$ is the potential change caused by a positive waveform (a voltage raise signal) sent by the driving source 151. In the present embodiment $\Delta V_{d1} = -\Delta V_{d2} = \Delta V_d$. After Step S11, the second output electric potential can be represented by $$V_2 = V_{m2} \bullet G_f + N = G_f \bullet \left\{V_{bias} + \Delta V_{d2} \bullet \left(\frac{C_f}{C_f + C_r + C_p}\right)\right\} + N.$$

The positive and negative waveforms are symmetric in shape, and are step functions in the present embodiment. At the final step S13, the output of the differential amplifier 310 can be represented by $$V_{final} = g \bullet (V_1 - V_2) =$$
$$g \bullet G_f \bullet \left\{+2\Delta V_d \bullet \left(\frac{C_r}{C_f + C_r + C_p}\right)\right\} = g \bullet G_f \bullet (-6)\left(\frac{C_r}{C_f + C_r + C_p}\right).$$

Here, g is the gain factor of the differential amplifier. The fixed pattern noise term (N) is cancelled in this method. In other words, the electric potential at the sensing electrode is set to the bias voltage ($V_{bias}$) and changes in response to the driving signal coupled to the finger 500 ($\Delta V_{d1}$ term or $\Delta V_{d2}$ term) while the capacitive sensing unit 100 is in the sensing state. Then the first output electric potential ($V_1$) is provided by the voltage follower 140 to the first charge holding capacitor 220 and retained by the first charge holding capacitor 220. The second output electric potential is provided in a similar way. In the end of the method, a noised-reduced value ($V_{final}$) is given by the differential amplifier 310.

Figure 9:
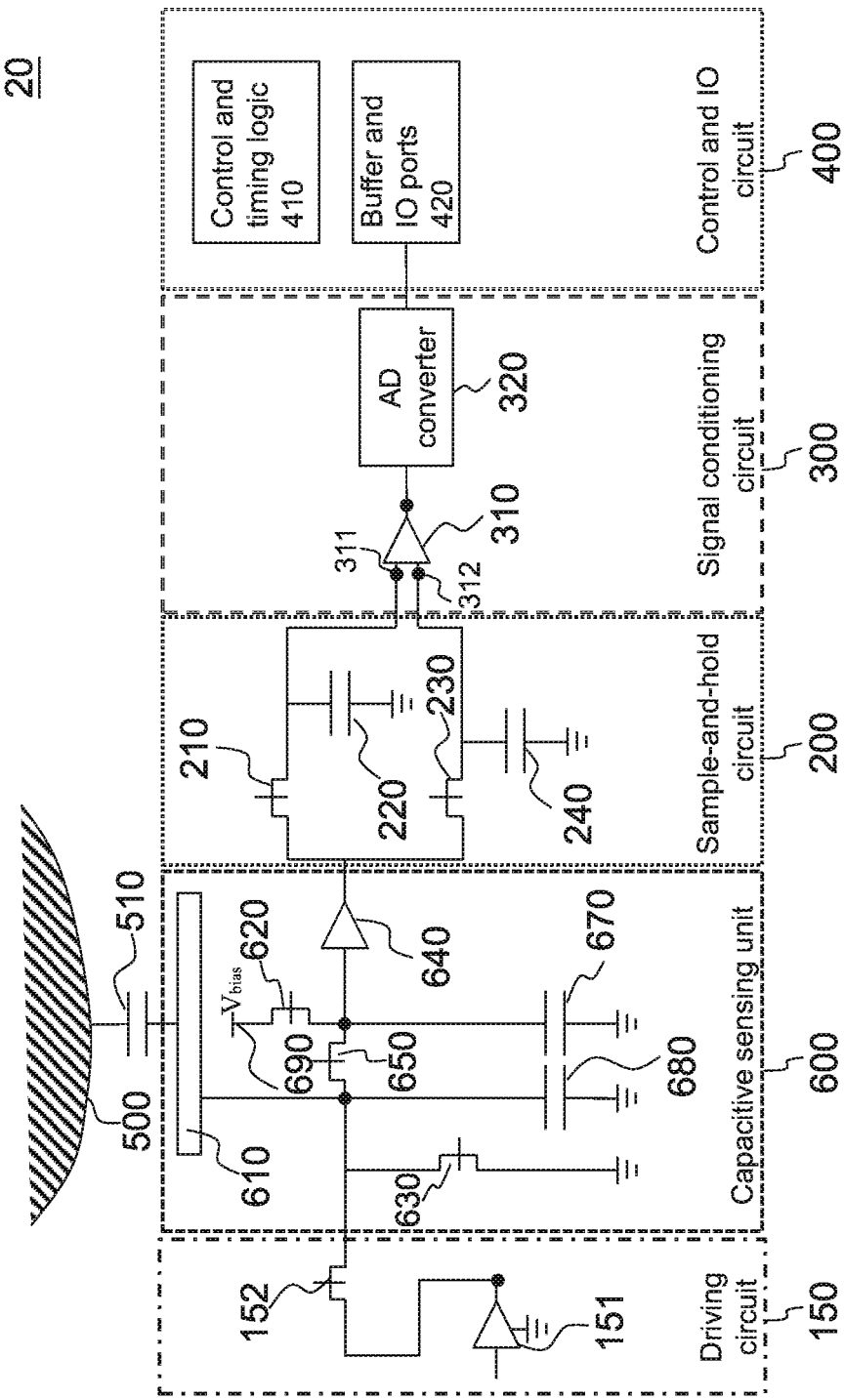
FIG. 9 is an equivalent circuit of the capacitive image sensor (one pixel) of a second embodiment according to the present invention.

Please refer to FIG. 9, FIG. 9 is an equivalent circuit of another embodiment of the capacitive fingerprint sensor 20 (one pixel). The only difference between the previous embodiment and this embodiment is the capacitive sensing unit 600. In the present embodiment, the capacitive sensing unit 600 includes a sensing voltage follower 640, a first comparative capacitor 670, a second comparative capacitor 680, and a bias voltage source 690. A parasitic capacitance representing the sum of parasitic capacitance between the input node of the voltage follower 640 and other parts of the sensing structure that are not connected to it (not shown) can be treated as a part of the first comparative capacitor 670. The value of the parasitic capacitance, denoted as $C_{p1}$, may include the parasitic input capacitance of the voltage follower 640, the drain-to-body capacitance of the first switch 620 and the share switch 650, or the stray capacitance of any device with one node connected to the voltage follower 640. Another parasitic capacitance representing the sum of parasitic capacitance between the sensing electrode 610 and other parts of the sensing structure that are not connected to it (not shown) can be treated as a part of the second comparative capacitor 680. The value of the parasitic capacitance, denoted as $C_{p2}$, may include the drain-to-body capacitance of the second switch 630 and the share switch 650, or the stray capacitance of any device with one node connected to the sensing electrode 610. A reference capacitor (not shown), having a capacitance $C_{r1}$, is formed between ground and the voltage follower 640 to store the electric charges during the operation. Another reference capacitor (not shown), having a capacitance $C_{r2}$, is formed between ground and the sensing electrode 610, to store the electric charges during the operation. The detail of the operation will be described in the later paragraphs. The first and second comparative capacitors (670 and 680) are equivalent capacitors, denoted as $C_{c1}$ and $C_{c2}$, representing the total effect of the parasitic capacitances and the reference capacitors respectively, i.e. $C_{c1}=C_{r1}+C_{p1}$ and $C_{c2}=C_{r2}+C_{p2}$. There may be a lack of the reference capacitor for the same reason described in the previous embodiment. When a finger 500 approaches to the capacitive sensing unit 600, a finger capacitance 510, denoted as $C_f$, is formed therein between. The sensing electrode 610 is a metal plate at the top side of the capacitive sensing unit 100, used to form one side of a parallel plate capacitor. Here, the parallel plate capacitor is an equivalent capacitor representing the finger capacitance 510. The other side of the parallel plate capacitor is the surface of the finger 500, which is part of the human body. The first switch 620 is a MOS device and one end thereof is connected to the input node of the voltage follower 640 and one end of the first comparative capacitor 670, and used to charge or discharge the first comparative capacitor 670. The other end of the first switch 620 is connected to the bias voltage source 690, while the other end of the first comparative capacitor 670 is connected to ground. The second switch 630 is also a MOS device. One end thereof is connected to the sensing electrode 610 and one end of the second comparative capacitor 680, and used to charge or discharge the sensing electrode 610 and the second comparative capacitor 680. The other end of the second switch 630 is connected to ground, and the other end of the second comparative capacitor 680 is also connected to ground. The share switch 650 is formed between the sensing electrode 610 and the voltage follower 640 (also between the first comparative capacitor 670 and the second comparative capacitor 680), and used to share the charges among the finger capacitance 510, the first comparative capacitor 670, and the second comparative capacitor 680. The bias voltage is 2V constant voltage reference in the present embodiment. The voltage follower 640 is a circuit device that has input and output signals. The output signal tracks the input signal. Usually, a voltage follower is implemented as a unity gain amplifier. The input node of the voltage follower 640 is connected to the first comparative capacitor 670, and the output node is connected to the sample-and-hold circuit 200. The driving switch 152 is connected between the driving source 151 and the sensing electrode 610. The method to control the states of the sensing units 600 is the same as the previous embodiment, no more tautology here.

Figure 10:
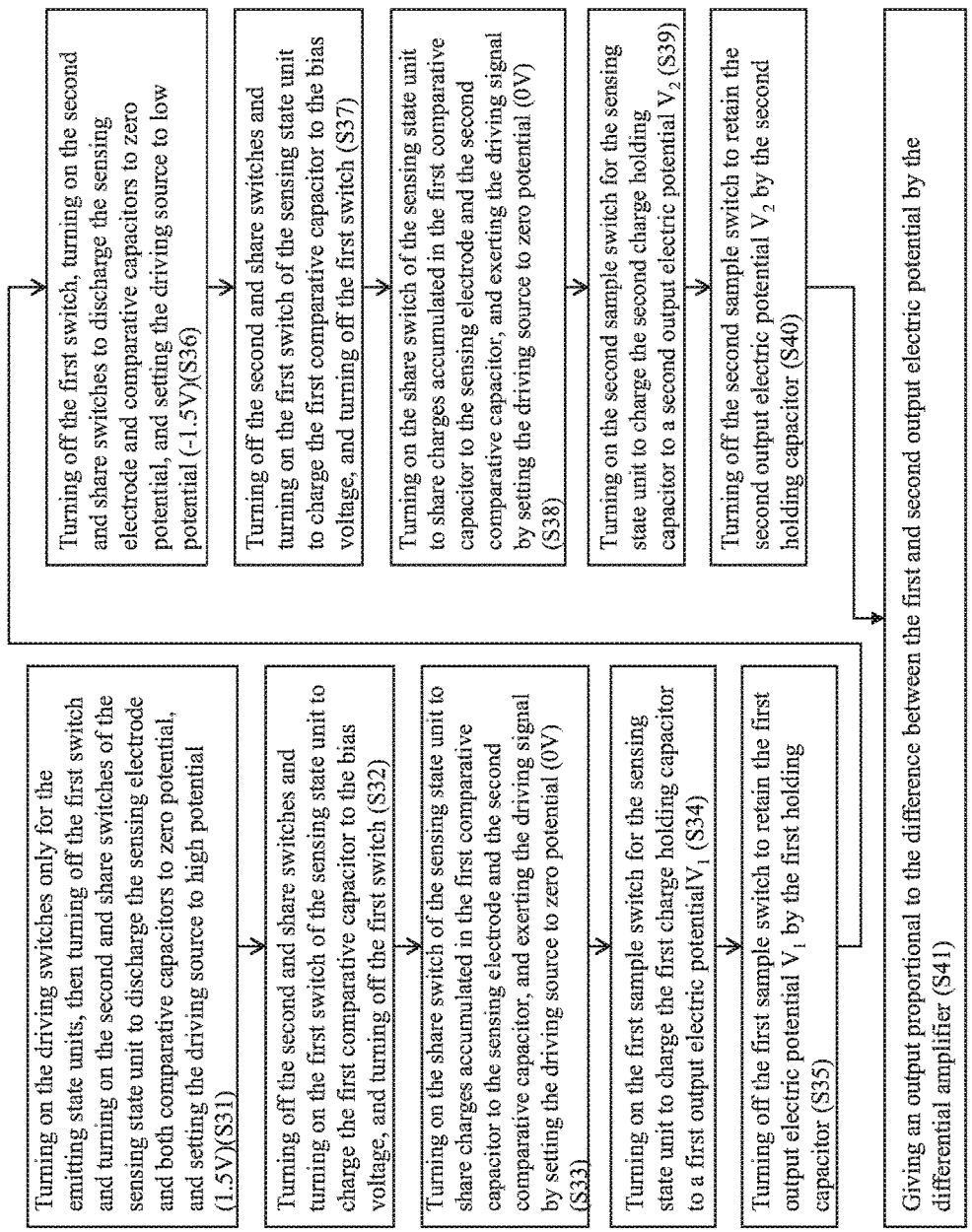
FIG. 10 is a flowchart illustrating a procedure to operate a capacitive sensing unit in the capacitive image sensor of the second embodiment.

A method for operating the capacitive image sensor 20 is also disclosed. Please refer to FIG. 10. It is a flowchart illustrating a procedure to operate a capacitive sensing unit 600 in the capacitive image sensor 20. The steps are:

(S31) turning on the driving switches only for the emitting state units, then turning off the first switch and turning on the second and share switches of the sensing state unit to discharge the sensing electrode and both comparative capacitors to zero potential, and setting the driving source 151 to high potential (1.5V);

(S32) turning off the second and share switches and turning on the first switch of the sensing state unit to charge the first comparative capacitor 670 to the bias voltage, and turning off the first switch;

(S33) turning on the share switch of the sensing state unit to share charges accumulated in the first comparative capacitor 670 to the sensing electrode 610 and the second comparative capacitor 680, and exerting the driving signal by setting the driving source to zero potential (0V);

(S34) turning on the first sample switch 210 for the sensing state unit to charge the first charge holding capacitor 220 to a first output electric potential $V_1$;

(S35) turning off the first sample switch 210 to retain the first output electric potential $V_1$ by the first charge holding capacitor 220;

(S36) turning off the first switch, turning on the second and share switches to discharge the sensing electrode 610 and comparative capacitors to zero potential, and setting the driving source 151 to low potential (−1.5V);

(S37) turning off the second and share switches and turning on the first switch of the sensing state unit to charge the first comparative capacitor 670 to the bias voltage, and turning off the first switch;

(S38) turning on the share switch of the sensing state unit to share charges accumulated in the first comparative capacitor 670 to the sensing electrode 610 and the second comparative capacitor 680, and exerting the driving signal by setting the driving source to zero potential (0V);

(S39) turning on the second sample switch 230 for the sensing state unit to charge the second charge holding capacitor 240 to a second output electric potential $V_2$;

(S40) turning off the second sample switch 230 to retain the second output electric potential $V_2$ by the second charge holding capacitor 240; and (S41) giving an output electric potential proportional to the difference between the first and second output electric potential by the differential amplifier 310.

Here, Steps S31 and S32 are the first reset stage, the Steps S33 to S35 are the first sensing stage, the Steps S36 to S37 are the second reset stage, the Steps S38 to S40 are the second sensing stage, and Step S41 is the final stage. Similarly, Sequence of steps S31-S35 and steps S36-S40 could be switched. The output electric potential in Step 41 is a noise-reduced value of that pixel (capacitive sensing unit). There may be additional steps to convert the output electric potentials into a digitized image. The steps are:

(S42) sequentially collecting the noise-reduced values obtained under corresponding positive waveform and negative waveform for each pixel (i.e. capacitive sensing units 600 will enter sensing state sequentially);

(S43) converting the noise-reduced values into digitized noise-reduced values; and (S44) mapping the digitized noise-reduced values to corresponding locations of capacitive sensing units to form a noise-reduced fingerprint image.

For a better understanding, a result analysis is illustrated below. After Step S33, the potential of the metal plate should be $$V_{m1} = V_{bias} \bullet \left(\frac{C_{c2}}{C_{c1} + C_{c2} + C_f}\right) + \Delta V_{d1} \bullet \left(\frac{C_f}{C_{c1} + C_{c2} + C_f}\right) =$$

$$2 \bullet \left(\frac{C_{c2}}{C_{c1} + C_{c2} + C_f}\right) - 1.5 \bullet \left(\frac{C_f}{C_{c1} + C_{c2} + C_f}\right).$$

Here, $V_{bias}$ is the potential of the bias voltage source 690, $C_f$ is the value of the finger capacitance 510, $C_{c1}$ is the value of the first comparative capacitor 670, and $C_{c2}$ is the value of the second comparative capacitor 680. After Step S34, the first output electric potential can be represented by $$V_1 = V_{m1} \bullet G_f + N =$$

$$G_f \bullet \left\{ V_{bias} \bullet \left(\frac{C_{c2}}{C_{c1} + C_{c2} + C_f}\right) + \Delta V_{d1} \bullet \left(\frac{C_f}{C_{c1} + C_{c2} + C_f}\right) \right\} + N.$$

Here, N is the fixed pattern noise caused by the voltage follower circuit and impedance mismatch of circuit elements, and $G_f$ is the gain factor of the voltage follower, usually less than 1. After Step S38, the potential of the metal plate should be $$V_{m2} = V_{bias} \bullet \left(\frac{C_{c2}}{C_{c1} + C_{c2} + C_f}\right) + \Delta V_{d2} \bullet \left(\frac{C_f}{C_{c1} + C_{c2} + C_f}\right) =$$

$$2 + 1.5 \bullet \left(\frac{C_f}{C_{c1} + C_{c2} + C_f}\right).$$

After Step S39, the second output electric potential can be represented by $$V_2 = V_{m2} \bullet G_f + N =$$

$$G_f \bullet \left\{ V_{bias} \bullet \left(\frac{C_{c2}}{C_{c1} + C_{c2} + C_f}\right) + \Delta V_{d2} \bullet \left(\frac{C_f}{C_{c1} + C_{c2} + C_f}\right) \right\} + N.$$

At the final step S41, the output of the differential amplifier 310 can be represented by $$V_{final} = g \bullet (V_1 - V_2) = g \bullet G_f \bullet \left\{ +2\Delta V_d \bullet \left(\frac{C_f}{C_{c1} + C_{c2} + C_f}\right) \right\} =$$

$$g \bullet G_f \bullet (-3)\left(\frac{C_f}{C_{c1} + C_{c2} + C_f}\right).$$

Here, g is the gain factor of the differential amplifier. The fixed pattern noise term (N) is cancelled in this method. In other words, the electric potential at the sensing electrode is set to ground (0V) and changes in response to the driving signal coupled to the finger ($\Delta V_{d1}$ term), and charges shared by the first comparative capacitor 670 while the capacitive sensing unit 600 is in the sensing state. Then the first output electric potential ($V_1$) is provided by the voltage follower 640 to the first charge holding capacitor 220 and retained by the first charge holding capacitor 220. The second output electric potential is provided in a similar way. In the end of the method, a noised-reduced value ($V_{final}$) is given by the differential amplifier 310.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A capacitive image sensor, comprising:
    a plurality of capacitive sensing units, arranged in a form of an array, wherein each of the plurality of capacitive sensing units switches between three states: sensing state, idle state, and emitting state; and each of the plurality of capacitive sensing units comprises:
        a sensing electrode; and
        a voltage follower, having an input node connected to the sensing electrode;
    a driving source, for providing a driving signal to an adjacent finger overlying the plurality of capacitive sensing units through the plurality of capacitive sensing units which are in the emitting state;
    a plurality of driving switches, each connected between one of the plurality of capacitive sensing units and the driving source; and
    a control and timing logic, connected to each of the plurality of driving switches, for controlling the state of each of the plurality of capacitive sensing units,
    wherein an electric potential of the sensing electrode is set to a predetermined voltage and changes in response to the driving signal provided to the adjacent finger while the capacitive sensing unit is in the sensing state; the electric potential of the sensing electrode is driven by the driving source while the capacitive sensing unit is in the emitting state; the electric potential of the sensing electrode is set to a constant voltage or left floating while the capacitive sensing unit is in the idle state; the driving signal has a positive waveform or a negative waveform formed by a potential change or potential changes of the driving source; the electric potential of each of the plurality of capacitive sensing units is reset before the driving signal is provided to the adjacent finger through the plurality of capacitive sensing units which are in the emitting state.

2. The capacitive image sensor according to claim 1, further comprising at least one sample-and-hold circuit, for capturing and retaining a first output electric potential of the voltage follower of the capacitive sensing unit which is in the sensing state while the driving signal has the positive waveform and a second output electric potential of the voltage follower of the capacitive sensing unit which is in the sensing state while the driving signal has the negative waveform.

3. The capacitive image sensor according to claim 2, further comprising at least one signal conditioning circuit, each comprising at least one differential amplifier for amplifying the difference between the first electric potential and the second electric potential retained by the sample-and-hold circuit, wherein a difference between the first output electric potential and the second output electric potential is a noise-reduced value which represents a distance between the capacitive sensing unit in the sensing state and the adjacent finger.

4. The capacitive image sensor according to claim 3, wherein the at least one signal conditioning circuit further comprises an analog-to-digital converter for converting the amplified difference into a digitized noise-reduced value.

5. The capacitive image sensor according to claim 4, wherein the digitized noise-reduced value of each of the plurality of capacitive sensing units is collected and mapped to a corresponding location of the capacitive sensing unit, and all collected digitized noise-reduced values together forms a noise-reduced fingerprint image of the adjacent finger, wherein each digitized noise-reduced value represents a pixel of the noise-reduced fingerprint image.

6. The capacitive image sensor according to claim 1, wherein each of the plurality of capacitive sensing units further comprises:
a first comparative capacitor, having one node electrically connected to the voltage follower and another node electrically connected to ground;
a bias voltage source, for providing a constant bias voltage to the sensing electrode and the first comparative capacitor; and
a first switch, connected between the bias voltage source and the first comparative capacitor.

7. The capacitive image sensor according to claim 6, wherein the first comparative capacitor comprises a reference capacitor and a parasitic capacitance.

8. The capacitive image sensor according to claim 7, wherein the reference capacitor is a MOSFET (Metal-Oxide-Semiconductor Field-Effect Transistor) capacitor, a PIP (Polysilicon-Insulator-Polysilicon) capacitor or a MIM (Metal-Insulator-Metal) capacitor.

9. The capacitive image sensor according to claim 6, wherein each of the plurality of capacitive sensing units further comprises:
a share switch, connected between the sensing electrode and the voltage follower;
a second comparative capacitor, connected between the sensing electrode and the ground; and
a second switch, connected between the sensing electrode and the ground,
wherein the sensing electrode is reset to ground potential when the second switch is turned on.

10. The capacitive image sensor according to claim 2, wherein each sample-and-hold circuit further comprises:
two charge holding capacitors, one for holding the first output electric potential and the other for holding the second output electric potential; and
at least one selecting switch, connected between the voltage follower and the two charge holding capacitors, for switching between one and the other depending on whether the driving signal has the positive waveform or the negative waveform.

11. The capacitive image sensor according to claim 1, wherein one of the plurality of capacitive sensing units is in the sensing state while another portion of the plurality of capacitive sensing units is in the emitting state, and the rest of the plurality of capacitive sensing units are in the idle state.

12. A method for obtaining a fingerprint image by the capacitive image sensor according to claim 1, comprising the steps of:
resetting the electric potential of each of the plurality of capacitive sensing units;
exerting the driving signal having a first waveform to the plurality of capacitive sensing units which are in the emitting state;
capturing a first output electric potential of the voltage follower of each of the plurality of capacitive sensing units which are in the sensing state;
retaining the first output electric potential of the voltage follower of each of the plurality of capacitive sensing units which are in the sensing state;
resetting the electric potential of each of the plurality of capacitive sensing units;
exerting the driving signal having a second waveform to the plurality of capacitive sensing units which are in the emitting state;
capturing a second output electric potential of the voltage follower of each of the plurality of capacitive sensing units which are in the sensing state;
retaining the second output electric potential of the voltage follower of each of the plurality of capacitive sensing units which are in the sensing state;
calculating the difference between the first output electric potential and second output electric potential;
converting the difference into a noise-reduced value;
sequentially collecting and digitizing the noise-reduced values of the plurality of capacitive sensing units which are in the sensing state into digitized noise-reduced values; and
mapping the digitized noise-reduced values to corresponding locations of the plurality of capacitive sensing units,
wherein each digitized noise-reduced value represents a pixel of the noise-reduced image.

13. The method according to claim 12, wherein if the first waveform is a positive waveform, then the second waveform is a negative waveform; if the first waveform is a negative waveform, then the second waveform is a positive waveform.

* * * * *